Feb. 22, 1944.   L. A. SAFFORD   2,342,303
FLOW REGULATING DEVICE
Filed March 6, 1943
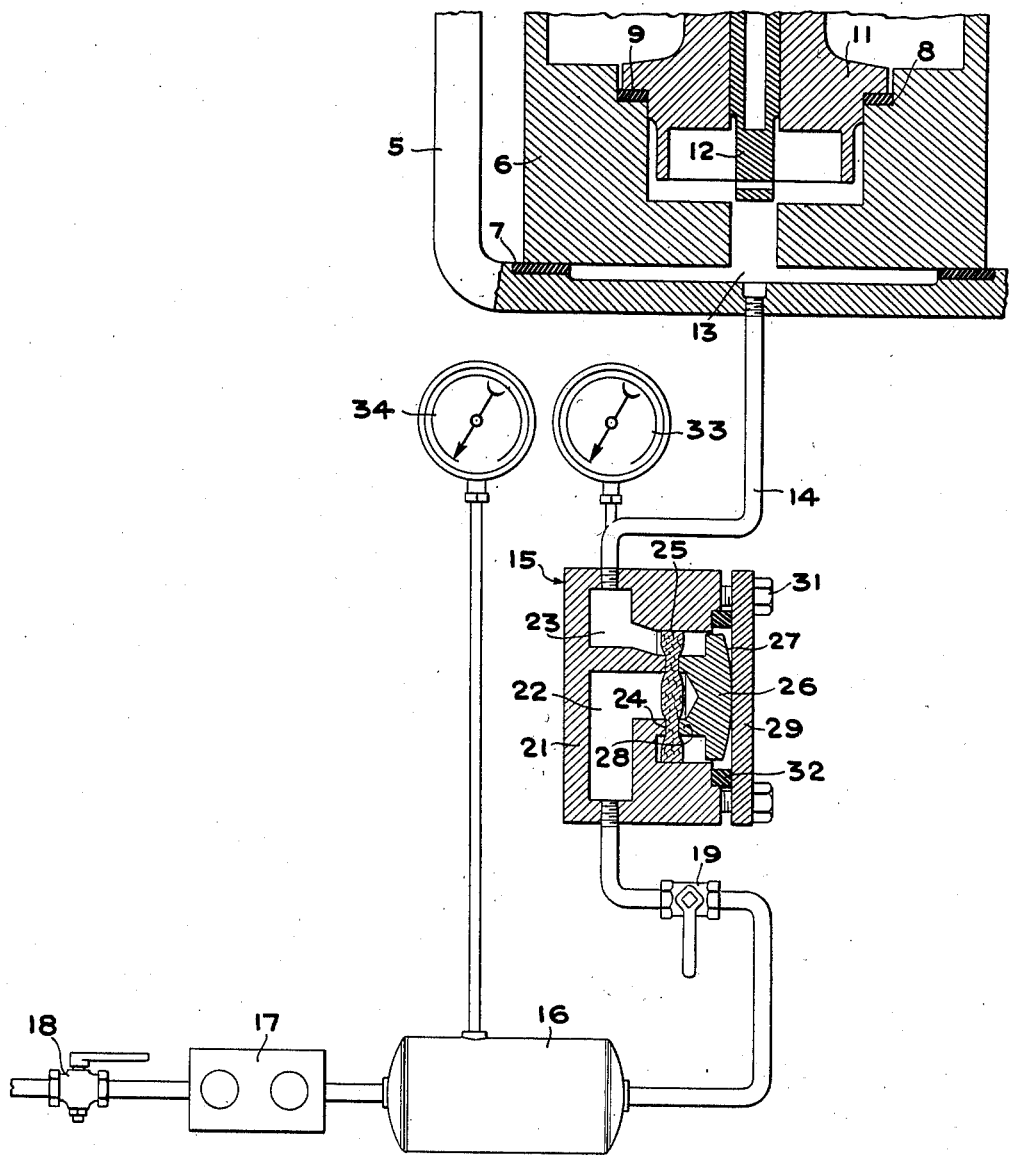
Inventor
Lewis A. Safford
By
Dodge
Attorneys Patented Feb. 22, 1944

2,342,303

UNITED STATES PATENT OFFICE 2,342,303

FLOW REGULATING DEVICE

Lewis A. Safford, Watertown, N. Y., assignor to The New York Air Brake Company, a corporation of New Jersey Application March 6, 1943, Serial No. 478,315

4 Claims. (Cl. 138—46)

This invention relates to flow regulating devices of the screen or filter type, and particularly to such devices employed as chokes in a compressed air line.

The use of flow restricting chokes in compressed air apparatus is a well known and effective expedient for reducing flow to any desired rate. Such a means is satisfactory until the flow restriction necessitates use of an orifice small enough to be subject to clogging by dust particles in the air stream. Clogging difficulties become increasingly aggravated as the orifice size is reduced, and it often becomes necessary to place two chokes in series to produce desired restriction with workable freedom from clogging. When, as in testing mechanical parts for closeness of fit, fixed orifices are utilized it becomes necessary to restrict the rate of flow greatly in order to make accurate observations of the measuring apparatus employed, and use of orifices presents to an exaggerated degree the difficulty discussed above.

It has been found that the difficulties can be overcome and satisfactory results obtained by use of a flow restricting element in the form of a porous mass, for example, a sheet of elastic fibrous material such as felt clamped between two parallel surfaces. By providing means for imposing uniform pressure upon the mass and making the inlet air enter the mass through a flat face of substantial area and then passing it radially through the mass between the clamping faces, clogging difficulties are overcome, desirably high uniform rates of restrictions can be imposed, and desired adjustments performed quickly and precisely.

The objects of the invention will appear more fully from the single figure of the drawing, in which an embodiment of the invention is illustrated as applied to apparatus for testing mechanical parts for closeness of fit. It is to be understood that this environment is illustrated by way of example only, as the invention is of general application in gas flow regulation.

In the drawing, reference character 5 designates a supporting frame only a portion of which is shown. Carried by this frame is a hollow block 6 resting on a sealing gasket 7. The block 6 is shouldered at 8 to receive a gasket 9 on which rests a valve stem guide 11 to be tested for its fit with respect to a valve stem 12. The parts are clamped together by suitable means not shown, so that air under pressure supplied to space 13 between block 6 and frame 5 can escape only between the space which may exist between stem 12 and guide 11.

Connected to the chamber 13 by pipe 14 is a source of air under pressure supplied from a flow regulating device 15. Device 15 receives the air from a fixed volume 16 supplied through a pressure regulating feed valve 17 connected to a suitable source of supply controlled by a shut-off valve 18. A second shut-off valve 19 is provided to isolate the volume 16 from the regulating device when the device is open, or the test parts are being placed or removed.

The device 15 comprises a hollow body 21 shaped to provide an inlet chamber 22 and an outlet chamber 23. A rim 24, preferably annular in form, surrounds the discharge end of chamber 22 and forms a seat for a porous sheet 25 of elastic fibrous material, such as felt. This sheet is preferably disc-like and of a diameter to overlie the rim 24 and extend beyond it. As shown it engages the walls of outlet chamber 23 but this is not essential. An equalizer 26 having a spherical head 27 and an annular rim 28 mating with rim 24 is clamped against the sheet 25 by a cover plate 29 and cap screws 31 threaded into body 21. A gasket 32 seals the space between body 21 and plate 29 and thus confines the flow of air escaping from chamber 22 through the sheet 25, to the outlet 23 whence it flows through pipe 14 to the space 13. The pressure in space 13 is measured by gauge 33 connected to pipe 14. A similar gauge 34 connected to volume 16 provides for observation of the supply pressure. Comparison of the readings of 33 and 34 permits determination of the pressure differential between the source of compressed air and pressure in chamber 13 determined by the rate of air escape between the guide and stem. The value of this differential determines whether or not the parts 11 and 12 are fitted within permissible limits.

In use a guide and stem combination is clamped in position in frame 5, and air admitted to inlet chamber 22 by opening valve 19. Air will then flow against the lateral face of sheet 25 where dust particles will be caught, the filtered air passing through the restrictions between rims 24 and 28 to chamber 23 at a reduced rate. Pressure will build up in chamber 13 at a rate dependent upon the restricting effect of sheet 25 and the leakage between stem 12 and guide 11. By suitable choice of flow rate restriction a satisfactory differential between readings of gauges 33 and 34 may be provided for.

While the invention is not directly concerned with the method of testing, the invention was developed for use in testing air brake components. In this art the permissible leakage is expressed in pounds per square inch pressure loss per minute from a fully charged condition. The standard for any particular component can easily be expressed in terms of the indications of gauges 33 and 34.

The fibrous sheet 25 presents many advantages. It permits variation of air flow by adjustment of the pressure applied to it by the rims 24 and 28. Choice of discs of varying thickness permits wide selection of the general range of the restriction, and the spherical head 27 on the equalizer 26 assures uniformity of pressure at all points of contact between the sheet and its supporting rims. The device permits extreme restrictions of rate of flow to insure adequate differentials between the readings of gauges 33 and 34, while safeguarding the device from failures due to clogging of the flow restricting means. The lateral face of the sheet adjacent to the inlet chamber 22 is large and insures free air inlet space regardless of the presence of dust particles, while the radial air escape areas between rims 24 and 28 are always protected against clogging. Thus the device avoids prior art clogging difficulties, provides extreme flexibility of flow range selection, and permits adjustments heretofore unknown.

What is claimed is:

1. A flow regulating device for gas under pressure comprising a flat body of elastic fibrous material; means for confining said body between clamping annuli forming opposed parallel surfaces to provide a gas inlet over a wide lateral area of said body, and a restricted gas outlet flow path between said surfaces; and means for varying the pressure applied to said body by said surfaces to vary the rate of gas flow through said body.

2. A flow regulating device for gas under pressure comprising a flat body of elastic fibrous material; means for confining said body between opposed parallel surfaces to provide a gas inlet over a wide lateral area of said body and a restricted gas outlet flow path between said surfaces; means for varying the pressure applied to said body by said surfaces to vary the rate of gas flow through said body; and means associated with said pressure varying means for circumferentially distributing the stresses applied to said body by said surfaces.

3. A flow regulating device for compressed air comprising a hollow two-part casing; a flat porous mass of flexible material held between said casing parts to define concentric inlet and discharge chambers; means for supplying compressed air to one of said chambers and against the flat face of the porous mass whence it flows at a restricted rate radially into said discharge chamber; and means for securing said casing parts together to secure uniform pressure against the portions of the mass that are in contact with the casing parts.

4. A gas flow regulator comprising a chambered member having an inlet terminating in an annular rim; a cover for said chamber terminating in a second rim mating with said first rim; a flat body of elastic fibrous material disposed between and under pressure from said rims to form a radial gas flow path through said body between said rims; and means for clamping said cover to said member to isolate the discharge of said flow path from said inlet except by way of said fibrous body.

LEWIS A. SAFFORD.